(No Model.)

A. R. DILLEHAY.
DRAFT EQUALIZER.

No. 442,960. Patented Dec. 16, 1890.

Witnesses:
Geo. E. Frech.
W. S. Duvall.

Inventor
Anthony R. Dillehay.
By his Attorneys,
C. A. Snow & Co.

UNITED STATES PATENT OFFICE.

ANTHONY R. DILLEHAY, OF AGENDA, KANSAS.

DRAFT-EQUALIZER.

SPECIFICATION forming part of Letters Patent No. 442,960, dated December 16, 1890.

Application filed October 1, 1890. Serial No. 366,720. (No model.)

*To all whom it may concern:*

Be it known that I, ANTHONY R. DILLEHAY, a citizen of the United States, residing at Agenda, in the county of Republic and State of Kansas, have invented a new and useful Draft-Evener, of which the following is a specification.

This invention has relation to draft-equalizers for heavy farm machines, the objects being to provide an equalizer adapted to equalize the draft between three or two horses and in accordance with their various gaits and strength and with the load being hauled, and to obviate transmitting the vibrations of the draft-pole or tongue, as caused by obstructions in the road, to the team, thereby drawing the load evenly and without interruption.

Other objects and advantages of the invention will hereinafter appear, and the novel features thereof will be particularly pointed out in the claims.

Figure 1:
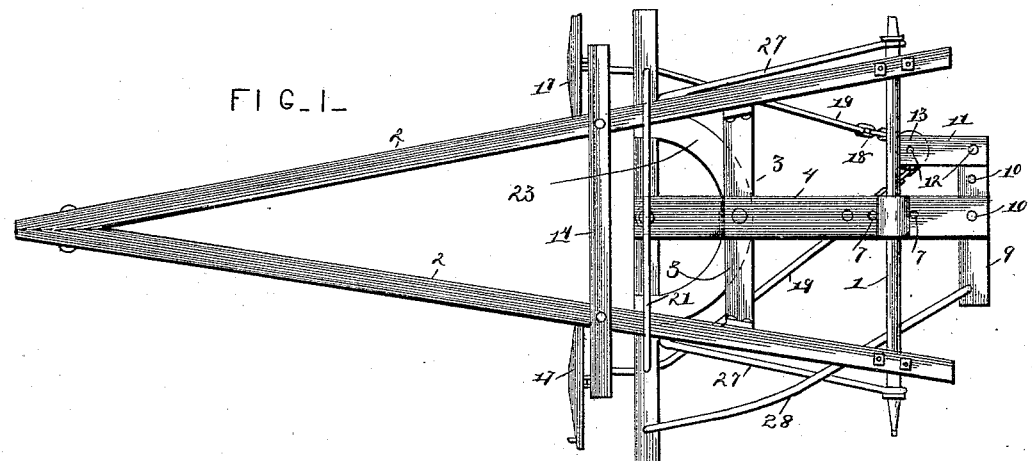
Figure 2:
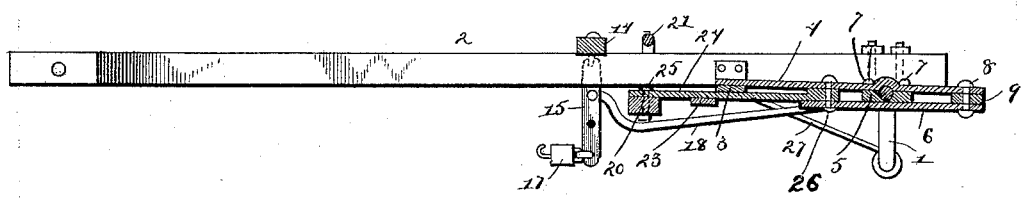
Figure 3:
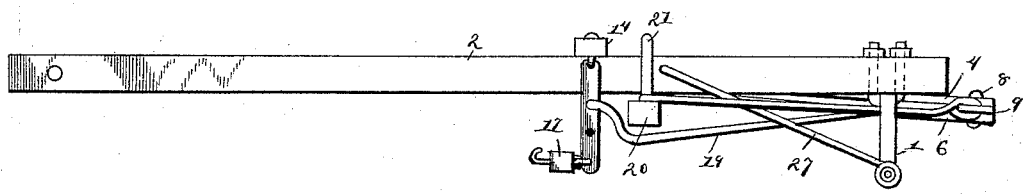

Referring to the drawings, Figure 1 is a plan of an equalizer constructed in accordance with my invention. Fig. 2 is a longitudinal section of the same. Fig. 3 is a side elevation.

Like numerals of reference indicate like parts in all the figures of the drawings.

1 designates the usual cranked axle of an agricultural machine, to which is secured the rear ends of a bifurcated draft-beam 2. A brace 3 connects the bifurcations of the draft beam or pole 2 near their rear ends, and the same has securely bolted at its middle the front end of a draft-bar 4, which extends rearward and half embraces the upper side of the axle 1 and terminates in rear of the same. The under side of the axle is embraced by a small plate 5. Under the plate 5, which is a clip-plate, is located a metal plate 6, which extends rearward and terminates flush with the corresponding end of the draft-bar 4, and the plate 5, with the plate 6 and bar 4, are securely bolted together by a pair of bolts 7. Pivoted, as at 8, between the rear ends of the bar 4 and the plate 6 is an equalizing-lever 9, having a series of perforations 10. In the outer perforation of the series, which occurs at the right-hand end of said equalizing-lever, is loosely pivoted a pulley-sheaf 11 by means of a bolt 12, and in said sheaf is located a loose pulley 13.

Upon the branches of the draft-pole there is bolted rigidly a doubletree 14, to the end of which are pivoted a pair of depending levers 15, having a series of perforations, in the lower ones of which are secured a pair of singletrees 17. A chain 18 passes around the pulley 13 of the sheaf 11, and to the ends of the same are connected a pair of rods 19, which diverge, and are each removably connected to any one of the adjusting-holes of one of the draft-levers 15. By arranging the hooked ends of the rods in various holes of the draft-levers the animals may secure a greater or less leverage. Consequently, if one animal is stronger than the other, it is allowed a less leverage than the other.

20 designates a movable doubletree, which by a bridle 21, which passes over the bifurcations of the draft-pole, is supported loosely underneath the pole. At the left-hand end of the doubletree is located a singletree 22, and secured to the doubletree opposite the bifurcated end of the draft-pole is a semicircular brace 23. A bar 24 is bolted, as at 25, at its front end to the said doubletree, the rear end of the bar being pivoted, as at 26, between the plate 6 and the bar 4.

27 designates a pair of inclined braces bolted to the branches of the draft-pole and to the axle near its end, and a rod 28 is pivoted to the free end of the equalizing-lever 9 and to the lever 20 about midway its longest side.

It will be observed that the equalizing-lever 9 is fulcrumed upon the bar 4 in rear of the axle, and may be adjusted so as to vary the draft upon the draft-levers 15 and the movable singletree 20, thus giving to the horse attached to the movable singletree a double leverage over the two animals attached to the draft-levers of the fixed singletree, and, furthermore, that if desired the strain upon the necks of the animals may be varied. By adjusting the draft-rods in the different holes of the draft-levers the draft may be equalized between the two horses adjacent to the draft-pole.

Having described my invention, what I claim is—

1. In a draft-equalizer, the combination, with the axle of the machine, the tongue secured thereto, the doubletree bolted rigidly upon the tongue, and the depending pivoted draft-levers carrying at their lower ends singletrees, of the doubletree located and supported under the draft-pole and provided at one end with a singletree, a draft-bar secured to the pole and extending rearward beyond the axle, an equalizing-lever pivoted in said draft-bar, a rod connecting one end of the lever to the last-mentioned or movable doubletree, a pulley mounted in the opposite end of the lever, a chain passing around the pulley and connected to the draft-levers, and a bar extending rearwardly from the movable doubletree and pivoted to the draft-bar, substantially as specified.

2. In a draft-equalizer, the combination, with the axle of the machine, of the bifurcated draft-pole clipped to the axle, the fixed doubletree bolted to the draft-pole, the depending perforated draft-levers terminating at their lower ends in singletrees, the movable doubletree extending at one end beyond the fixed doubletree and carrying a singletree at its extended end, a bridle mounted on said doubletree and taking over the draft-pole, a transverse plate connecting the bifurcations of the draft-pole, a draft-bar bolted to said plate and clipped to the axle and terminating beyond the same, a plate bolted to the draft-bar and terminating at its rear end flush with said bar, the equalizing-lever having the series of perforations fulcrumed adjustably between the draft-bar and plate, a rod connecting one end of the lever with the movable doubletree, a sheaf and its pulley loosely pivoted in one of the perforations of said lever, a chain passed loosely around the pulley, diverging draft-rods connected to the chain and loosely connected at their front ends to the adjusting-holes of the pivoted draft-levers, a bar bolted to the movable doubletree and extending rearward and pivoted between the draft-bar and its plate, and a U-shaped brace secured to the said doubletree and to the rearwardly-disposed bar, substantially as specified.

3. In a draft-equalizer, the combination, with the axle of the machine, the tongue secured thereto, and the fixed doubletree secured to the tongue, of the movable doubletree located and supported under the draft-pole and provided at one end with a singletree, opposite singletrees connected to the ends to the fixed doubletree, a draft-bar secured to the pole and extending rearward beyond the axle, an equalizing-lever pivoted in said draft-bar, a rod connecting one end of the lever to the movable doubletree, a pulley mounted in the opposite end of the lever, a chain passing around the pulley and connected to the fixed doubletree, and a bar extending rearward from said doubletree and pivoted to the draft-bar, substantially as specified.

In testimony that I claim the foregoing as my own I have hereto affixed my signature in presence of two witnesses.

ANTHONY R. DILLEHAY.

Witnesses:
R. A. McCord,
E. R. DeBray.